United States Patent [19]

Maillet

[11] 4,097,710

[45] Jun. 27, 1978

[54] METHOD AND APPARATUS FOR ELECTRICAL MACHINING

[75] Inventor: Alfred Marie Aimé Maillet, Versailles, Yvelines, France

[73] Assignee: Carel Fouche Languepin, Paris, France

[21] Appl. No.: 769,189

[22] Filed: Feb. 16, 1977

Related U.S. Application Data

[63] Continuation of Ser. No. 600,905, Jul. 31, 1975, abandoned, which is a continuation-in-part of Ser. No. 395,590, Sep. 10, 1973, abandoned.

[51] Int. Cl.² ............................................... B23P 1/08
[52] U.S. Cl. .............................. 219/69 D; 204/129.43; 204/224 M; 219/69 M; 219/69 V
[58] Field of Search ................ 219/69 D, 69 V, 69 C, 219/69 R, 69 E, 69 M; 204/129.43, 224 M

[56] References Cited

U.S. PATENT DOCUMENTS

| | | | |
|---|---|---|---|
| 2,766,364 | 10/1956 | Higgens et al. | 219/69 D |
| 2,996,602 | 8/1961 | Webb | 219/69 D |
| 3,334,210 | 8/1967 | Williams et al. | 219/69 D |
| 3,530,270 | 9/1970 | Ross | 219/69 C |
| 3,594,299 | 7/1971 | Inoue | 219/69 C |
| 3,607,689 | 9/1971 | Inoue | 204/224 M |
| 3,616,343 | 10/1971 | Inoue | 204/224 M |
| 3,699,303 | 10/1972 | Kauffman et al. | 219/69 D |
| 3,851,135 | 11/1974 | Moracz et al. | 219/69 D |
| 3,864,541 | 2/1975 | Inoue | 219/69 C |

FOREIGN PATENT DOCUMENTS

| | | | |
|---|---|---|---|
| 19,659 | 8/1968 | Japan | 219/69 D |

*Primary Examiner*—Bruce A. Reynolds
*Attorney, Agent, or Firm*—Karl F. Ross

[57] ABSTRACT

A source of intermittent unipolar voltage pulses is connected across an electrode and a workpiece to be machined, defining between them an erosion gap which is swept by a continuously moving, slightly electrolytic liquid. With suitable spacing of the pulses, the flow of the liquid removes excess ions and detritus from the erosion gap while its conductivity limits the voltage peak at the beginning of each discharge. To insure an even distribution of the flow, the liquid is admitted to the gap from above through one or more passages formed in the electrode, spreading symmetrically in opposite directions.

21 Claims, 11 Drawing Figures

METHOD AND APPARATUS FOR ELECTRICAL MACHINING

CROSS-REFERENCE TO RELATED APPLICATION

This application is a continuation of application Ser. No. 600,905, filed Jul. 31, 1975, which is a continuation-in-part of application Ser. No. 395,590, filed Sep. 10, 1973, both abandoned.

FIELD OF THE INVENTION

My present invention relates to a method of and an apparatus for machining a metallic workpiece by electro-erosion, with the aid of an electrode separated from the workpiece by a narrow gap which is occupied by an ionizable liquid, the electrode being periodically pulsed to generate ionic discharges within the liquid which erode the confronting workpiece surface and give it a profile substantially constituting a negative replica of the electrode profile or matrix.

BACKGROUND OF THE INVENTION

In my prior U.S. Pat. No. 3,777,108, issued Dec. 4, 1973, I have disclosed a system of this nature, designed to practice the so-called EDM (electric-discharge machining) process, wherein the applied voltage pulses folow one another in close succession, the energizing circuit for the electrode and the workpiece including one or more reactances designed to maintain a residual potential difference across the gap at instants when the applied voltage goes to zero. The liquid in the gap being of a dielectric nature, this residual potential difference serves to initiate an intensified current flow through the gap on a rising flank of each new voltage pulse, thereby enhancing the erosion effect while preventing the buildup of excessive peak voltages which would tend to accelerate the wear of the electrode.

On the other hand, it is also known to shape a metallic workpiece electrochemically, with the use of an electrolytic liquid and a driving voltage making the electrode potential more negative than that of the workpiece. Generally, surfaces shaped by electrochemical machining (ECM) are smoother than those produced with the EDM technique but do not as faithfully replicate the shape of the electrode.

A combination of both techniques has also been proposed in order to minimize their respective disadvantages. In U.S. Pat. No. 3,594,299 to Kiyoshi Inoue, for example, electrochemical machining is carried out by a d-c component while a pulsating voltage insures better approximation of the shape of the electrode or tool by the eroded workpiece surface.

OBJECTS OF THE INVENTION

The principal object of my present invention is to provide an improved method of and apparatus for machining metallic workpiece surfaces by a modified EDM technique which, in a single operation, faithfully replicates the electrode profile on the workpiece, leaving that workpiece with a smooth and polished surface to enable its use, for example, as part of a casting mold for glass, plastic or light metals.

A related object is to minimize electrode wear, not only for economical reasons, but also to enhance the accuracy of reproduction of the original shape.

SUMMARY OF THE INVENTION

I have discovered that excessive electrode wear can be prevented even without the maintenance of a d-c component across the gap if the liquid in that gap is weakly conductive so that current begins to flow practically simultaneously with the energization of the electrode and the workpiece. On the other hand, if excess ions due to the preceding spark discharge are allowed to remain in the liquid within the gap during the interval between voltage pulses, the likelihood exists that an ensuing spark will find a zone of ion concentration in the path of the preceding spark so that successive sparks will preferentially occur in the same location instead of being randomly distributed over the electrode surface, resulting in objectionable pitting of the machined surface. Pursuant to my present invention, this risk is eliminated by mechanically removing the excess ions from the gap between pulses, together with metallic or other detritus present in the gap, by maintaining a continuous flow of the liquid through the gap and spacing successive pulses sufficiently far apart to allow a restoration of the conductivity (or resistivity) of the liquid within the gap to substantially its intrinsic value before each new pulse.

In such a system, machining is quickly started by a discharge at the beginning of each voltage pulse and continues thereafter by electrolysis, the latter effect leading to a smooth surface finish which could never be obtained with spark-discharge machining alone. At the same time, the recurrent discharges insure that the machined workpiece surface precisely parallels the working face of the electrode.

Thus, it is the judicious combination of the two techniques of spark erosion and electroforming which, in accordance with my invention, provides faithful replication without objectionable pitting. The optimum relationship of the two effects can be selected in each specific instance, according to requirements, by suitable choice of such parameters as open-circuit voltage (determined by the gap width), width of the applied voltage pulses, spacing of these pulses, and resistivity of the liquid, within ranges indicated below. In making molds for the casting of multifaceted glass bodies resembling cut crystal, for example, the electrolytic effect should predominate to provide a high degree of polish; in replicating a spherically curved surface, on the other hand, relatively more intense spark discharges may be used.

The conductivity of the liquid may vary between substantially 0.001 and 0.15 mho/cm, thus ranging from that of tap water to that of weak electrolytes; a preferred value is 0.05 mho/cm, or about 50 times the conductivity of natural water. Within that range, and with peak open-circuit voltages not exceeding a few hundreds of volts (preferably about 50 - 100 V), spark discharges will be regularly generated. The width of the erosion gap between the workpiece and the electrode is preferably between about 0.1 and 0.2 mm, resulting in the initiation of discharges upon attainment of a potential difference of approximately 4 to 20 V across the gap on the rising flank of the voltage wave; the gap width may be controlled by a servomechanism responsive to a predetermined mean potential difference within that range, e.g. of about 6 V.

I have determined that, under these conditions and with discharge pulses recurring at a cadence or repetition frequency of substantially 20 to 200 Hz, the desired sweep-out of excess ions by a moving electrolyte can usually be achieved within inter-pulse pauses or intervals of a duration substantially equaling the pulse width, i.e. with a duty ratio of about 50%. Thus, the electrode and the workpiece may be energized from a source of alternating voltage (such as the usual utility mains having a supply frequency of 50 or 60 Hz) via a simple half-wave rectifier suppressing alternate half-cycles, preferably letting pass only the pulses which drive the electrode negative with reference to the workpiece in order to eliminate electrolytic wear of the electrode. A smaller duty ratio, i.e. longer pauses with reference to the pulse width, can be realized by a variety of means, advantageously with the aid of an electronic switch such as a thyratron or a thyristor having a control electrode connected to the power supply through a timing circuit designed to pass only part of the unsuppressed voltage cycles, either a fraction of each negative half-cycle or one out of every two, three etc. half-cycles of this polarity. Thus, the timing circuit may comprise an integrating network or a binary counter inserted between the supply and the control electrode.

Although the flow velocity of the liquid in the gap is not critical, a more or less even flow distribution over the workpiece surface is desirable to prevent undue concentrations of residual ions in localized areas. In accordance with a further feature of my invention, therefore, I prefer to circulate the liquid into the gap through a central aperture in the electrode, preferably a narrow slot extending parallel to a major dimension of the workpiece surface. With a slot width on the order of 1 mm, the liquid may be driven through that slot under a pressure difference between substantially 1 and 5 bars (or atmospheres) generated by a pump which is in series with a conduit leading to the slot from a reservoir for the liquid. It is also advantageous to set the electrode and the workpiece in relative vibration, naturally with a stroke which is less than the width of the intervening erosion gap, with at least one substantially complete vibratory cycle accompanying each discharge pulse; this action further stimulates the dislodgment of detritus from the gap and helps eliminate localized ion concentrations.

BRIEF DESCRIPTION OF THE DRAWING

The above and other features of my invention will now be described in detail with reference to the accompanying drawing in which.

SPECIFIC DESCRIPTION

Figure 1:
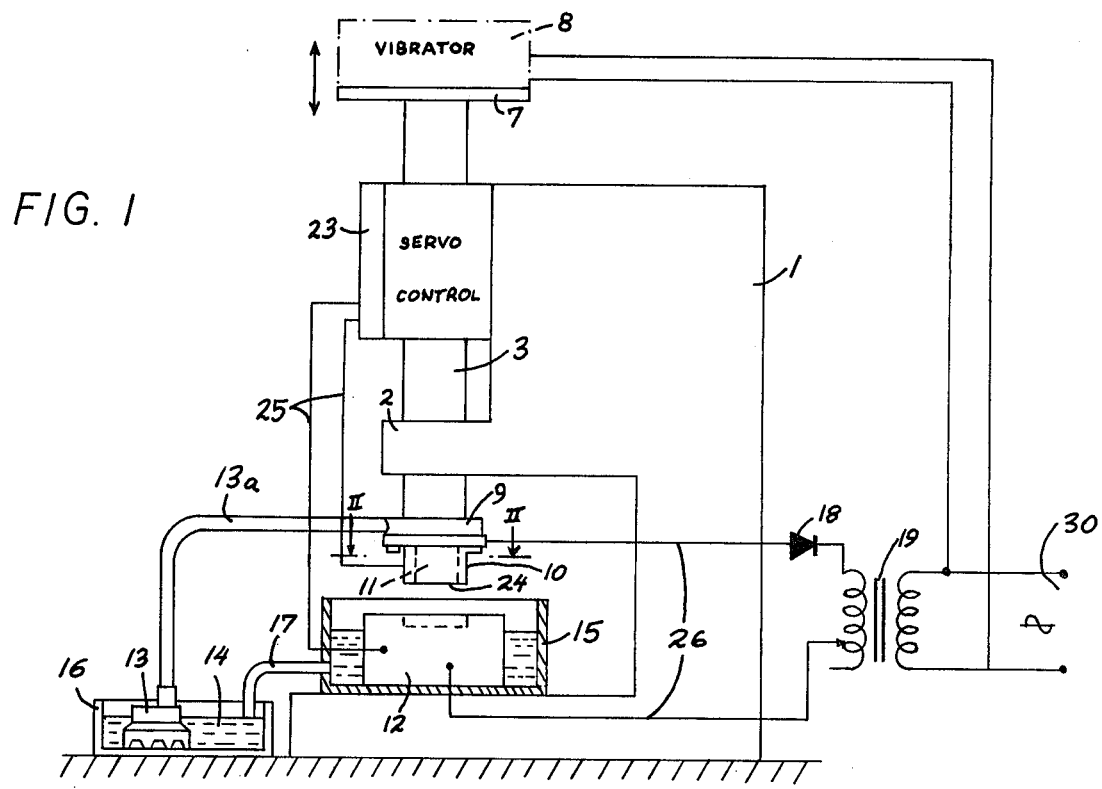
FIG. 1 is a somewhat diagrammatic side-elevational view, partly in section, of an apparatus for machining a metallic workpiece in accordance with my invention.

The apparatus shown in FIG. 1 comprises a U-shaped frame 1 with a bearing arm 2 traversed by a vertical column 3 whose elevation is limitedly adjustable by a servo-control mechanism 23. The top of column 3 is formed by a plate 7 which carries a vibrator 8 driven by a source of alternating current 30, such as a utility mains with a frequency of 50 or 60 Hz. With the vibrator responding to each half-cycle of the supply voltage, its operating frequency is twice the mains frequency.

A holder 9 at the foot of column 3 carries an electrode 10 which serves as a tool or matrix for machining a metallic workpiece 12, the electrode and the workpiece being separated by a gap 24 shown greatly exaggerated in FIG. 1. Electrode 10 is a prismatic copper block of rectangular (nearly square) outline. A central slot 11, parallel to the major sides of the rectangle, extends over most of the length thereof and communicates via a conduit 13a and a pump 13 with a reservoir 16 containing a weakly electrolytic liquid 14 whose conductivity ranges between about 0.001 and 0.15 mho/cm. The action of pump 13 produces across the slot 11 a pressure differential between about 1 and 5 bars, thereby continuously recirculating the electrolyte through a vessel 15 which receives the workpiece 12 and communicates through a drain 17 with reservoir 16.

Electrode 10 and workpiece 12 are connected in an energizing circuit 26 which includes the secondary of an input transformer 19 in series with a diode 18, the primary of transformer 19 being energized from source 30. Diode 18 passes only those voltage pulses from the secondary of transformer 19 which drive the electrode 10 negative with reference to workpiece 12; the amplitude of these voltage pulses can be varied with the aid of a tap on that secondary. Transformer 19 is advantageously of the magnetic-loss type so as to limit the flow of primary current in the event, for example, of an accidental short circuit between the electrode and the workpiece.

Figure 6A:
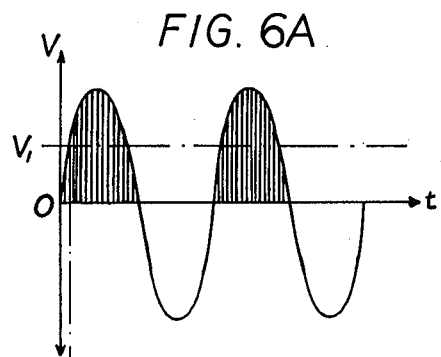
FIGS. 6A, 7A and 8A show voltage pulses generated by the circuits of FIGS. 1, 4 and 5, respectively.
Figure 6B:
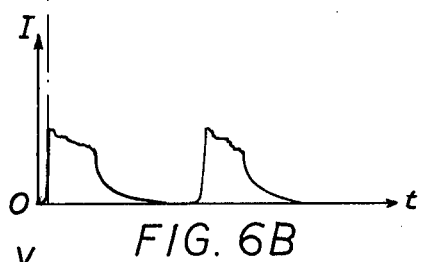
FIGS. 6B, 7B and 8B show the corresponding discharge currents.

In FIG. 6A I have shown the primary voltage from source 30, the half-cycles effective to energize the electrode 10 and the workpiece 12 being indicated by vertical shading. A voltage level $V_1$ represents the breakdown potential (as reflected to the primary side of the transformer) giving rise to the passage of a discharge current through the liquid in gap 24. As shown in FIG. 6B, however, a current I starts flowing through the gap practically at the beginning of the half-cycle, owing to the conductivity of the liquid, the current rising sharply upon attainment of the breakdown level $V_1$. After the voltage has returned to zero, some current continues to flow on account of the charge stored in the capacitance constituted by electrode 10 and workpiece 12; thanks to the action of pump 13, however, the liquid 14 within the gap 24 quickly regains its inherent high resistance so that current flow virtually ceases well before the commencement of the next half-cycle passed by diode 18.

Figure 2:
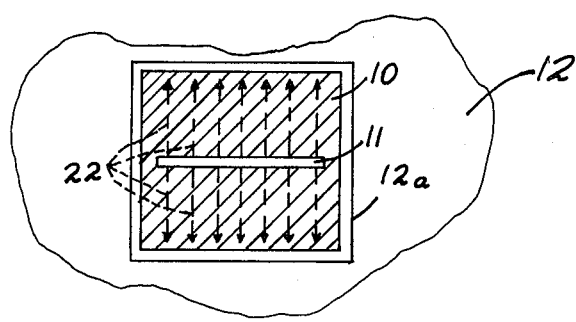
FIG. 2 is a sectional detail view taken on the line II — II of FIG. 1.

As best seen in FIG. 2, the liquid traversing the slot 11 distributes itself substantially uniformly over the surface of the underlying workpiece 12 as indicated by arrows 22. A recess 12a machined in the workpiece 12 is only slightly wider than the electrode (the difference having been exaggerated in the drawing) and has a profile faithfully conforming to that of its matrix. Servomechanism 23 is connected across the gap 24 by a circuit 25 to sense the mean voltage difference across that gap and to vary the position of column 3 accordingly with a view to maintaining that mean voltage and therefore the gap width constant.

EXAMPLE

An electrode 10 of square outline, with a side length of 2 cm, had a slot 11 whose width was about 1 mm; the effective thickness of the liquid stream passing therethrough, under a pressure differential of 3.5 bars, was approximately 0.7 mm. The pulses passed by diode 18 had a peak open-circuit value of 60 V and the servomechanism 23 was set to maintain a mean gap voltage of about 6 V, this voltage ranging between 4 and 8 V with an effective discharge current of about 85 amps. The electrolyte 14 was soap water (an alkalinic medium) with a conductivity of 4.5 mho/m. Workpiece 12 was a steel block and, upon being machined to a depth of 5 mm, was found to have a recess 12a exceeding the dimensions of the electrode by a uniform distance of 0.12 mm. The impression or recess 12a had a perfectly polished and bright surface.

Other possible electrolytes, which do not chemically attack metallic workpieces, include mineral oils combined with emulsifiers.

Figure 3:
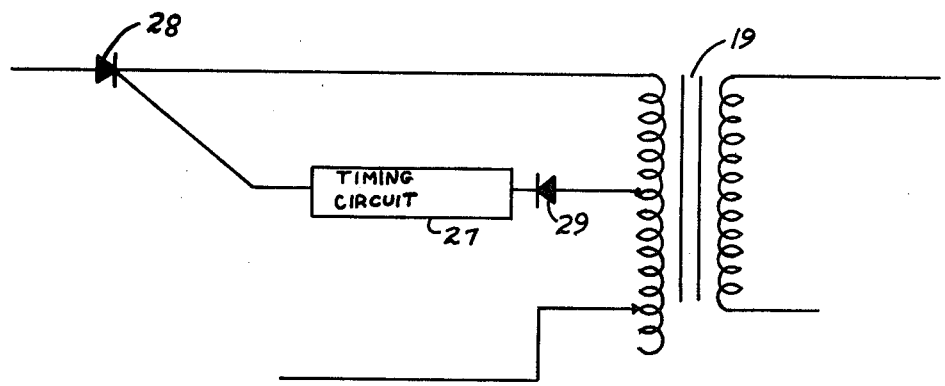
FIG. 3 shows part of a modified energizing circuit for the apparatus of FIG. 1.
Figure 4:
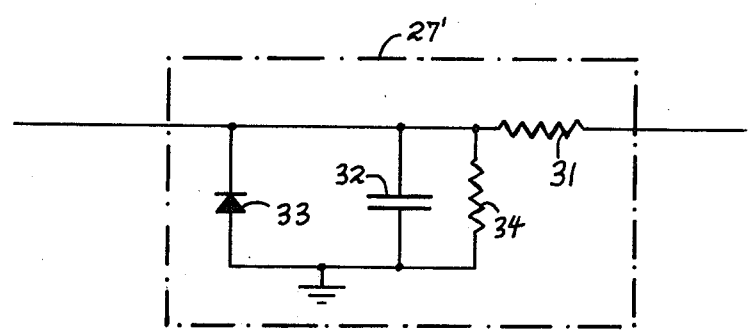
FIGS. 4 and 5 diagrammatically illustrate two versions of a component of the circuit of FIG. 3.
Figure 5:
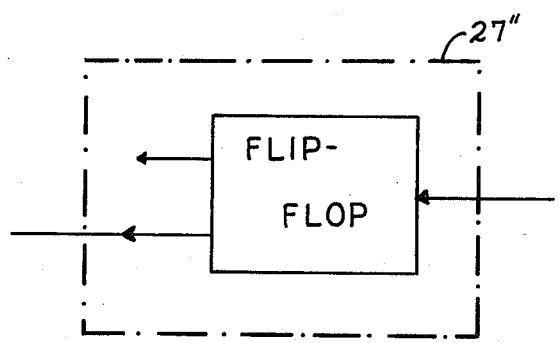
Figure 7A:
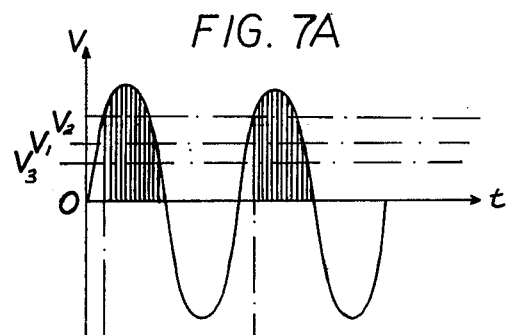
Figure 7B:
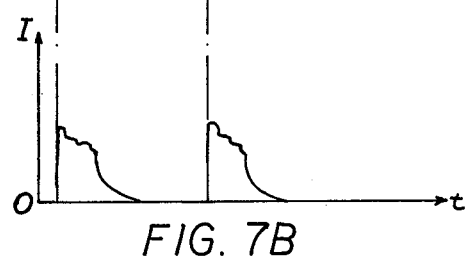
Figure 8A:
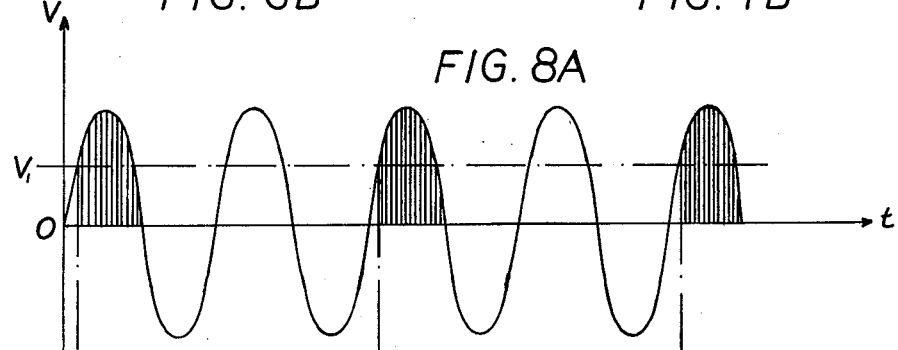
Figure 8B:
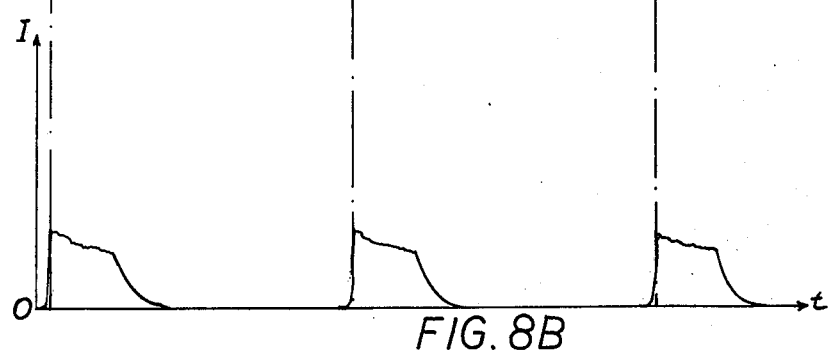

As shown in FIG. 3, the diode 18 of FIG. 1 can be replaced by a thyristor or SCR 28 whose control electrode is connected via a timing circuit 27 and a diode 29 to a tap of the secondary of transformer 19. Timing circuit 27, designed to allow only a part of the unsuppressed cycles of the secondary voltage to pass to the electrode 10 and the workpiece 12 of FIG. 1, is triggered by a fraction of that secondary voltage to fire the thyristor 28. As shown in FIG. 4, this timing circuit may be an integrating network 27' with a series resistor 31 and a shunt capacitor 32, the latter being in parallel with a diode 33 and a resistor 34. This network delays the firing of the thyristor for a predetermined period, as illustrated in FIG. 7A, to a point in the cycle in which the applied voltage has reached a level $V_2$ higher than the breakdown voltage $V_1$; thyristor 28 cuts off at a lower level $V_3$. The resulting current I, FIG. 7B, therefore consists of spaced pulses whose width is less than in FIG. 6B so that more time remains between these pulses for the sweep-out of excess ions. As shown in FIG. 5, the timing circuit could also be a binary counter 27", here simply represented by a flip-flop which is alternately set and reset by incoming trigger pulses from diode 29 (FIG. 3); the flip-flop has an output only during every other cycle of the supply voltage so that energization of the erosion gap can occur only once in every two cycles as illustrated in FIG. 8A; the corresponding current pulses I are shown in FIG. 8B and have the same width as those of FIG. 6B but are spaced more widely apart, thereby again increasing the sweep-out time.

My invention is particularly applicable to the electrical machining of smooth-surfaced dies conforming with great precision to the shape of a matrix represented by the elctrode 10, this electrode being subject only to negligible wear in the process.

I claim:

1. A method of machining a metallic workpiece by electro-erosion, comprising the steps of:
    positioning an electrode adjacent said workpiece with an intervening gap;
    continuously passing a weakly conductive ionizable liquid through said gap; and
    periodically energizing said electrode and said workpiece with a unidirectional voltage sufficient to generate ionic discharge pulses with a cadence in a range of substantially 20 to 200 Hz within said liquid in said gap with a spacing sufficient to allow detritus to be swept off, thereby letting the current in said gap substantially decay before each new pulse.

2. A method as defined in claim 1 wherein the inherent conductivity of said liquid ranges between substantially 0.001 and 0.15 mho/cm.

3. A method as defined in claim 1 wherein said discharge pulses are separated by intervals at least equal to the pulse width.

4. A method as defined in claim 1 wherein said liquid is circulated into said gap through a central aperture in said electrode.

5. A method as defined in claim 4 wherein said aperture is a slot with a width on the order of 1 mm and said liquid is driven through said slot under a pressure difference between substantially 1 and 5 bars.

6. A method as defined in claim 1 wherein said electrode is driven negative by said voltage.

7. A method as defined in claim 6 wherein said gap has a width of about 0.1 to 0.2 mm and the mean potentiel difference across said gap ranges betwen substantially 4 and 20 volts during discharge.

8. A method as defined in claim 1 wherein said electrode and said workpiece are set in relative vibration with at least one substantially complete vibratory cycle accompanying each discharge pulse.

9. A method as defined in claim 1 wherein said liquid is an alkalinic medium.

10. An apparatus for machining a metallic workpiece by electro-erosion, comprising:
    an electrode spaced by a gap from a surface of a workpiece to be machined;
    a reservoir containing a weakly conductive ionizable liquid;
    pump means for continuously driving said liquid through said gap; and
    a source of intermittent unipolar voltage pulses with a cadence in a range of substantially 20 to 200 Hz connected across said electrode and said workpiece for periodically energizing said electrode and said workpiece to generate ionic discharge pulses within said liquid with a spacing sufficient to allow detritus to be swept off, thereby letting the current in said gap substantially decay before each new pulse.

11. An apparatus as defined in claim 10 wherein said electrode overlies said workpiece and is provided with a central aperture which opens into said gap, further comprising conduit means extending from said reservoir to said aperture.

12. An apparatus as defined in claim 11 wherein said aperture is a narrow slot extending over the greater part of said electrode in a major dimension thereof.

13. An apparatus as defined in claim 12 wherein said slot has a width on the order of 1 mm, said major dimension being on the order of centimeters.

14. An apparatus as defined in claim 11, further comprising vibrator means mechanically coupled with said electrode.

15. An apparatus as defined in claim 10 wherein said source includes a supply of alternating voltage and rectifier means for suppressing alternate half-cycles of said voltage.

16. An apparatus as defined in claim 15 wherein said rectifier means is connected to pass only negative pulses to said electrode.

17. An apparatus as defined in claim 16 wherein said source further comprises an electronic switch controlled by timing means for passing only a part of the unsuppressed half-cycles of said voltage to said electrode.

18. An apparatus as defined in claim 17 wherein said electronic switch is provided with a control electrode connected to said supply.

19. An apparatus as defined in claim 18 wherein said timing means further includes an integrating network inserted between said supply and said control electrode.

20. An apparatus as defined in claim 18 wherein said timing means further includes a binary counter inserted between said supply and said control electrode.

21. An apparatus as defined in claim 10 wherein said source has an open-circuit voltage in a range of substantially 50 to 100 V.

* * * * *